United States Patent Office 3,047,608
Patented July 31, 1962

3,047,608
PHOSPHITES
Lester Friedman, Whitestone, N.Y., and Henry Gould, West Orange, N.J., assignors to Weston Chemical Corporation, Newark, N.J., a corporation of New Jersey
No Drawing. Filed Sept. 15, 1960, Ser. No. 56,129
24 Claims. (Cl. 260—461)

This invention relates to the preparation of phosphite esters.

It is an object of the present invention to develop an improved process for preparing tertiary phosphites of high boiling alcohols.

Another object is to prepare such phosphites having improved phyiscal properties and particularly having improved purity.

A further object is to prepare novel phosphites.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained by transesterification of an aromatic phosphite having the formula

where $R_1$, $R_2$ and $R_3$ are aryl or haloaryl with the desired alcohol in the presence of a dialkyl phosphite, a dihaloalkyl phosphite, diaryl phosphite or a dihaloaryl phosphite as a catalyst. The dialkyl or diaryl phosphite catalyst or the like is preferably used in an amount of 0.1 to 1% by weight of the triaryl phosphite. There is no need to add more catalyst and since the catalyst is usually left with the product, the range set forth above is the preferred one. The catalysts have the formula

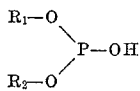

where $R_1$ and $R_2$ are aryl, haloaryl, alkyl and haloalkyl.

The transesterification is carried out by distilling out the phenol form. Preferably reduced pressure is employed, e.g., 10–20 mm. The heating is carired out until the desired amount of phenol has been removed, e.g., one, two or three mols per mol of triaryl phosphite starting material. The transesterification can also be controlled by limiting the amount of alcohol which is added, e.g. by adding one, two or three mols of a monohydric alcohol per mol of triaryl phosphite, or adding for each mol of triaryl phosphite either one mol or 1.5 mols of glycol.

Mixed esters can also be prepared by a two step reaction. For example, one mol of pentaerythritol can be reacted with two mols of triphenyl phosphite and one mol of the 3,9-diphenoxy-2,4,8,10-tetraoxa-3,9-diphosphaspiro [5,5] undecane thus formed can then be reacted with two mols of a monohydric alcohol, e.g., decyl alcohol, to form the corresponding 3,9-didecyloxy compound. The catalyst present in this first step of the reaction also serves in the second step of the reaction. Alternatively, mixed esters can be prepared by adding all the reactants and catalyst together in a one step reaction but this is not preferred.

The dialkyl and diaryl phosphites employed as catalysts are neutral in contrast to the alkali metal alkoxides and phenolates which are alkaline. The process of the present invention is superior to the use of the alkoxides and phenolates in that products of better color are obtained, no filtration problems are encountered and the entire operation is more easily handled in the plant. There is less resin and gum formation and less color bodies.

In transesterifying alcohols boiling above the phenol formed from the triaryl phosphite, the yields are almost quantitative. With lower boiling alcohols somewhat lower yields occur.

The preferred alcohols are alkanols, 1,2-alkanediols, 1,3-alkanediols, pentaerythritol, and monoalkyl ethers of ethylene glycol and polyethylene glycol. In making bis dioxaphosphorinanes the use of polyethylene glycol, polypropylene glycol, thiodiglycol and sulfonyldiglycol are useful for forming the bridge between the two dioxaphosphorinane rings.

The isodecyl alcohol employed in the examples was made by the oxo process.

As examples of catalysts which can be used, there are diphenyl phosphite, didecyl phosphite, phenyl decyl phosphite, di (2-methylphenyl) phosphite, di (3-methylphenyl) phosphite, di (4-methylphenyl) phosphite, di (4-dodecylphenyl) phosphite, di (2,4-dimethylphenyl) phosphite, di (2-chlorophenyl) phosphite, di (4-bromophenyl) phosphite, di (3-iodophenyl) phosphite, di (2-fluorophenyl) phosphite, dimethyl phosphite, dihexyl phosphite, dicyclohexyl phosphite, dioctyl phosphite, dioctadecyl phosphite, dilauryl phosphite, dichloroethyl phosphite.

As the triaryl phosphites and trihaloaryl phosphites which can be employed in the transesterification there can be used triphenyl phosphite, tris (2-methylphenyl) phosphite, tris (3-methylphenyl) phosphite, tris (4-methylphenyl) phosphite, tris (2-ethylphenyl) phosphite, tris (2-isopropyphenyl) phosphite, tris (2-chlorophenyl) phosphite, tris (2-bromophenyl) phosphite, tris (4-iodophenyl) phosphite, tris (2-fluorophenyl) phosphite, tris (2,4-dimethylphenyl) phosphite, tris (4-dodecylphenyl) phosphite, tris (ortho-t-butylphenyl) phosphite, tris (2-t-butyl-4 methylphenyl) phosphite.

As the alcoholic reactant there can be used methyl alcohol, butyl alcohol, tetrahydrofurfuryl alcohol, n-octanol, 2-ethyl hexanol, isooctyl alcohol, n-decyl alcohol, isodecyl alcohol, lauryl alcohol, tridecyl alcohol, myristyl alcohol, cetyl alcohol, stearyl alcohol, cyclohexanol, alkanediols or glycols such as ethylene glycol, propylene glycol, trimethylene glycol, 1,2-butylene glycol, 2,3-butylene glycol, pinacol, 1,2-pentanediol, hexylene glycol (2-methyl-2,4 pentanedoil), 1,3-butylene glycol, neopentyl glycol, 2-ethyl-1,3-hexanediol, 2,4-pentanedoil, 2,4-heptanediol, 2,2-diethyl-1,3-propanediol, 2-ethyl-2-n-butyl-1,3-propanediol, neohexylene glycol, (2-ethyl-2-methyl-1,3-propanediol), monoalkyl monoaryl ethers of alkanedoils, e.g., methyl ether of ethylene glycol, ethyl ether of ethylene glycol, butyl ether of ethylene glycol, methyl ether of diethylene glycol, ethyl ether of diethylene glycol, butyl ether of diethylene glycol, methyl ether of polyethylene glycol of molecular weight 300–350, ethyl ether of polyethylene glycol of molecular weight of 300–350, methyl ether of polyethylene glycol of molecular weight 550, methyl ether of polyethylene glycol of molecular weight 4000, methyl ether of triethylene glycol, phenyl ether of ethylene glycol.

When dihydric alcohols are used as linking compounds to form bis phosphorinanes and bis phospholanes there can be employed in addition to the glycols set forth above, diethylene glycol, triethylene glycol, tetraethylene glycol, polyethylene glycol of average molecular weight about 350, polyethylene glycol of average molecular weight about 525 (Carbowax 525), polyethylene glycol of average molecular weight 4000 (Carbowax 4000), dipropylene glycol, polyethylene glycol of average molecular weight 725 (Carbowax 725), tripropylene glycol, polypropylene glycol with average molecular weight 525, thiodiglycol and sulfonyl diglycol.

Among the products which can be prepared by the present invention are tris (isodecyl) phosphite,
tris (β-phenoxyethyl) phosphite,
tri stearyl phosphite, trilauryl phosphite,
phenyl di-(isodecyl) phosphite,
diphenyl isodecyl phosphite,
di(isodecyl) o-t-butylphenyl phosphite,
tritetrahydrofurfuryl phosphite,
di(isodecyl) 2-ethylphenyl phosphite,
ditetrahydrofurfuryl phenyl phosphite,
tetrahydrofurfuryl diphenyl phosphite,
di(isodecyl) 2-isopropylphenyl phosphite,
trioctyl phosphite,
tributyl phosphite,
di(isodecyl) 2-t-butyl-4-methylphenyl phosphite,
di(methoxyethyl) phenyl phosphite,
di(methoxyethyl) decyl phosphite,
di(ethoxyethyl) phenyl phosphite,
di(methoxypolyethoxyethyl) phenyl phosphite (where the polyethoxyethyl group averages about 350 in molecular weight),
di(butoxyethyl)phenyl phosphite,
di(methoxyethyl) o-cresyl phosphite,
methoxyethyl diphenyl phosphite,
ethoxyethyl diphenyl phosphite, butoxyethyl diphenyl phosphite,
methoxyethoxyethoxyethyl diphenyl phosphite,
butoxyethoxyethoxyethyl diphenyl phosphite,
di(ethoxyethoxyethoxyethyl) phenyl phosphite,
di(methoxyethyl) octadecyl phosphite,
methoxyethyl di(octadecyl) phosphite,
di(methoxyethoxyethyl) decyl phosphite,
di(methoxyethoxyethyl) octadecyl phosphite,
di(methoxyethoxyethoxyethyl) decyl phosphite,
di(butoxyethoxyethoxyethyl) octyl phosphite,
butoxyethoxyethoxyethyl di(octyl) phosphite,
methoxyethoxyethoxyethyl di(decyl) phosphite,
tri(methoxyethyl) phosphite,
tri(ethoxyethyl) phosphite,
tri(butoxyethyl) phosphite,
tri(methoxyethoxyethyl) phosphite,
tri(ethoxyethoxyethyl) phosphite,
tri(butoxyethoxyethyl) phosphite,
tri(methoxyethoxyethoxyethoxyethyl) phosphite,
tri(methoxyethoxyethoxyethyl) phosphite,
tri(ethoxyethoxyethoxyethyl) phosphite,
tri(butoxyethoxyethoxyethyl) phosphite,
tri(methoxypolyethoxyethyl) phosphite (where the polyethoxyethyl group has an average molecular weight of about 350),
tri(methoxypolyethoxyethyl) phosphite (where the polyethoxyethyl group has a molecular weight of about 550),
tri(phenoxyethoxyethyl) phosphite,
tri(p-cresyloxyethoxyethyl) phosphite,
tri(phenoxyethoxyethoxyethyl) phosphite,
di(methoxyethoxyethoxyethyl)phenyl phosphite,
methoxyethoxyethoxyethyl diphenyl phosphite.

The ether phosphites having the formula

are new compounds. In the formula $R_1$ is alkoxyethoxyethyl, aryloxyethoxyethyl, alkoxypolyethoxyethyl or aryloxypolyethoxyethyl, while $R_2$ and $R_3$ are the same as $R_1$ or alkyl or aryl. Preferably $R_1$ is

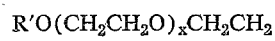

where R' is lower alkyl and $x$ is an integer of at least 1. These new compounds are useful as stabilizers for polyolefins, e.g. polyethylene and polypropylene, for purifying organic compounds, as stabilizers for acrylonitrile polymers, and as stabilizers for polyurethane rubbers, nylon, polyethers and Delrin (high molecular weight formaldehyde polymer) and as scavengers for small quantities of carboxyl groups from polyesters or for removing small amounts of phenol.

There also can be prepared dioxaphospholanes and dioxaphosphorinanes having the formula

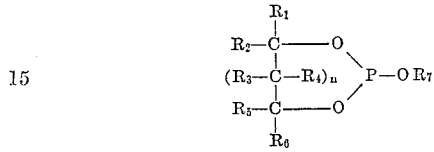

wherein $R_1$, $R_2$, $R_3$, $R_4$, $R_5$ and $R_6$ are selected from the group consisting of hydrogen and lower alkyl, $n$ is an integer of the group consisting of 0 and 1 and $R_7$ is selected from the group consisting of aryl, alkyl, alkoxyethyl, alkoxypolyalkoxyalkyl, aryloxyalkyl and aryloxypolyalkoxyalkyl.

These compounds are prepared by reacting one mol of the appropriate 1,2 glycol or 1,3 glycol with one mol of a triaryl phosphite in the presence of the dialkyl phosphite or diaryl phosphite catalyst. If the desired phospholane or phosphorinane is the aryl derivative no further reaction is required. However, if it is desired to have a different substituent in the 2-position of the ring, then there is added one mol of the appropriate alkanol, alkoxyethanol, aryloxyethanol, alkoxypolyethoxyethanol or aryloxypolyethoxyethanol.

There can be prepared by the present process any of the dioxaphospholanes and dioxaphosphorinanes disclosed in Hechenbleikner et al. Patent No. 2,834,798 and in McManimie Patent No. 2,893,961. Typical examples of such materials which can be prepared are 2-phenoxy-1,3,2-dioxaphosphorinane (phenyl trimethylene phosphite),
2-cyclohexyloxy-1,3,2-dioxaphosphorinane,
2-(2'-ethylphenoxy)-4,4,6-trimethyl-1,3,2-dioxaphosphorinane,
2-methoxy-1,3,2-dioxaphosphorinane,
2-isopropoxy-1,3,2-dioxaphosphorinane,
2-ethoxy-1,3,2-dioxaphosphorinane,
2-sec. butoxy-1,3,2-dioxaphosphorinane,
2-octyloxy-1,3,2-dioxaphosphorinane,
2-decyloxy-1,3,2-dioxaphosphorinane,
2-isodecyloxy-1,3,2-dioxaphosphorinane,
2-octadecyloxy-1,3,2-dioxaphosphorinane,
2-decyloxy-5,5-dimethyl-1,3,2-dioxaphosphorinane,
2-isodecyloxy-4-propyl-5-ethyl-1,3,2-dioxaphosphorinane,
2-isodecyloxy-5-ethyl-5-methyl-1,3,2-dioxaphosphorinane,
2-isodecyloxy-5,5-diethyl-1,3,2-dioxaphosphorinane,
2-decyloxy-4,4,6-trimethyl-1,3,2-dioxaphosphorinane,
2-octadecyloxy-5,5-dimethyl-1,3,2-dioxaphosphorinane,
2-phenoxy-5,5-dimethyl-1,3,2-dioxaphosphorinane,
2-phenoxy-4-methyl-1,3,2-dioxaphosphorinane,
2-phenoxy-4,4,6-trimethyl-1,3,2-dioxaphosphorinane,
2-octadecyloxy-4,4,6-trimethyl-1,3,2-dioxaphosphorinane,
2-isodecyloxy-5-methyl-5-ethyl-1,3,2-dioxaphosphorinane,
dioxaphospholanes such as ethylene phenyl phosphite,
ethylene methyl phosphite, ethylene decyl phosphite,
ethylene octadecyl phosphite,
ethylene p-cresyl phosphite,
1-methylethylene phenyl phosphite,
1-methylethylene decyl phosphite,
1-methylethylene octadecyl phosphite,
1,2-dimethylethylene decyl phosphite,
ethylene isodecyl phosphite,
1,2-dimethylethylene phenyl phosphite,
1,2-dimethylethylene octadecyl phosphite,
1,1,2,2-tetramethylethylene phenyl phosphite, 1,1,2,2-tetramethylethylene decyl phosphite,
1,1,2,2-tetramethylethylene octadecyl phosphite and
1-propylethylene decyl phosphite.

The dioxaphospholanes and dioxaphosphorinanes wherein $R_7$ is alkoxyethyl, alkoxypolyethoxyethyl, aryloxyethyl and aryloxypolyethoxyethyl are new compounds. These novel compounds are useful as antioxidants for polyethylene, polypropylene, polyethylene glycols, natural and synthetic rubber, etc.

Examples of novel dioxaphospholanes and dioxaphosphorinanes which can be prepared according to the invention are ethylene methoxyethyl phosphite (2-methoxyethyl-1,3,2-dioxaphospholane),
ethylene ethoxyethyl phosphite,
ethylene butoxyethyl phosphite,
ethylene methoxyethoxy ethyl phosphite,
ethylene methoxyethoxyethoxyethyl phosphite,
ethylene butoxyethoxyethoxyethyl phosphite,
1-methylethylene methoxyethyl phosphite,
1-methylethylene methoxyethoxyethyl phosphite,
1-methylethylene methoxyethoxyethoxyethyl phosphite,
1,2-dimethylethylene methoxyethyl phosphite,
1,2-dimethylethylene methoxyethoxyethoxyethyl phosphite,
1,1,2,2-tetramethylethylene methoxyethyl phosphite,
1,1,2,2-tetramethylethylene methoxyethoxyethoxyethyl phosphite,
1-propylethylene methoxyethoxyethyl phosphite,
ethylene methoxypolyethoxyethyl phosphite (where the polyethoxyethyl group has an average molecular weight of about 350), 2-methoxyethyl-1,3,2-dioxaphosphorinane,
2-methoxyethoxyethyl-1,3,2-dioxaphosphorinane,
2-methoxypolyethoxyethyl-1,3,2-dioxaphosphorinane (where the polyethoxyethyl group has an average molecular weight of 1500), 2-methoxyethyl-5,5-dimethyl-1,3,2-dioxaphosphorinane,
2-ethoxyethyl-5,5-dimethyl-1,3,2-dioxaphosphorinane,
2-butoxyethyl-5,5-dimethyl-1,3,2-dioxaphosphorinane,
2-methoxyethoxyethyl-5,5-dimethyl-1,3,2-dioxaphosphorinane,
2-butoxyethoxyethyl-5,5-dimethyl-1,3,2-dioxaphosphorinane,
2-methoxyethoxyethoxyethyl-1,3,2-dioxaphosphorinane,
2-methoxypolyethoxyethyl-1,3,2-dioxaphosphorinane (where the polyethoxyethyl group has an average molecular weight of 350), 2-methoxyethyl-5-methyl-5-ethyl-1,3,2-dioxaphosphorinane, 2-methoxyethoxyethyl-5-methyl-5-ethyl-1,3,2-dioxaphosphorinane, 2-methoxypolyethoxy-ethyl-1,3,2-dioxaphosphorinane (where the polyethoxyethyl group has an average molecular weight of about 550), 2 - methoxyethyl - 4,4,6 - trimethyl - 1,3,2 - dioxaphosphorinane (methoxyethyl hexylene phosphite), 2-methoxyethoxyethyl - 4,4,6 - trimethyl - 1,3,2 - dioxaphosphorinane, 2 - butoxyethoxyethoxyethyl - 4,4,6 - trimethyl - 1,3,2, - dioxaphosphorinane, 2 - methoxyethoxyethyl-4 - propyl - 5 - ethyl - 1,3,2 - dioxaphosphorinane and 2-phenoxyethyl - 5,5 - dimethyl - 1,3,2 - dioxaphosphorinane.

Likewise according to the invention, there can be prepared all of the pentaerythritol phosphites of the type disclosed in Hechenbleikner Patent No. 2,847,443 and Gould et al. application, Serial No. 4,888, filed January 27, 1960. Preferably there are prepared tetraoxadiphosphaspiro undecanes of the formula

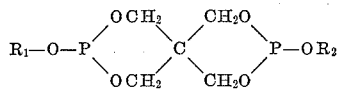

where $R_1$ and $R_2$ are selected from the group consisting of aryl, alkyl, aryloxyethyl, alkyloxyethyl, aryloxyethoxyethyl, alkyloxyethoxyethyl and alkloxypolyethoxyethyl.

Examples of such compounds are 3,9-diphenoxy-2,4,8,10-tetraoxa-3,9-diphosphaspiro [5,5] undecane (diphenyl pentaerythritol diphosphite), 3,9-di(decyloxy) 2,4,8,10-tetraoxa-3,9-diphosphaspiro [5,5] undecane, 3,9-di(isodecyloxy) 2,4,8,10-tetraoxa-3,9-diphosphaspiro [5,5] undecane, 3,9-di(octadecyloxy) 2,4,8,10-tetraoxa-3,9-diphosphaspiro [5,5] undecane, 3-phenoxy-9-isodecyloxy-2,4,8,10-tetraoxa-3,9-diphosphaspiro [5,5] undecane, 3,9-di(methoxy)-2,4,8,10-tetraoxa-3,9-diphosphaspiro [5,5] undecane 3,9-di(lauryl)-2,4,8,10-tetraoxa-3,9-diphosphaspiro [5,5] undecane, 3,9-di-p-tolyoxy-2,4,8,10-tetraoxa-3,9-diphosphaspiro [5,5] undecane; 3,9-di(methoxyethyl) 2,4,8,10-tetraoxa-3,9-diphosphaspiro [5,5] undecane; 3-methoxyethyl - 9 - isodecyl - 2,4,8,10 - tetraoxa - 3,9 - diphosphaspiro [5,5] undecane; 3,9-di(ethoxyethyl)-2,4,8,10-tetraoxa-3,9-diphosphaspiro [5,5] undecane; 3,9-di(butoxyethyl)-2,4,8,10-tetraoxa-3,9-diphosphaspiro [5,5] undecane; 3-methoxyethyl-9-butoxyethyl-2,4,8,10-tetraoxa-3,9-diphosphaspiro [5,5] undecane; 3,9-di(methoxyethoxyethyl)-2,4,8,10-tetraoxa-3,9-diphosphaspiro [5,5] undecane; 3,9-di(butoxyethoxyethyl-2,4,8,10-tetraoxa-3,9-diphosphaspiro [5,5] undecane, 3,9-di(methoxyethoxyethoxyethyl)-2,4,8,10-tetraoxa-3,9-diphosphaspiro [5,5] undecane, 3,9-di(methoxypolyethoxyethyl) - 2,4,8,10-tetraoxa-3,9-diphosphaspiro [5,5] undecane (where the polyethoxyethyl group has an average molecular weight of 350), 3,9-di(methoxypolyethoxyethyl)-2,4,8,10-tetraoxa-3,9-diphosphaspiro [5,5] undecane (where the polyethoxyethyl group has an average molecular weight of 550).

The above tetraoxadiphosphaspiro undecanes where $R_1$ and/or $R_2$ is aryloxyethyl, alkyloxyethyl, aryloxyethoxyethyl, alkyloxyethoxyethyl or alkyloxypolyethoxyethyl are new compounds. These new compounds are useful as stabilizers for polyolefins such as polyethylene and polypropylene, stabilizers for polyurethanes and for scavenging traces of catalyst from polypropylene and as curing agents for epoxy resins.

The dialkyl phosphite and diaryl phosphite catalysts of the present invention can also be used to form linked phosphorinanes and phospholanes by either a one step process wherein all the reactants are added together or more preferably by a two step process wherein 2 mols of triaryl phosphite are reacted with 2 mols of a glycol and phenol is distilled out, preferably at reduced pressure, e.g. 10–20 mm., and at a temperature not over 145° C., until 4 mols of phenol have been removed and then one mol more of the same or different glycol is added and the reaction continued until 2 more mols of phenol have been distilled out under the reduced pressure up to a pot temperature of 150–200° C.

The linked compounds have the formula

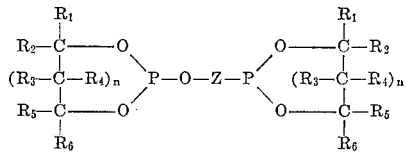

where $R_1$, $R_2$, $R_3$, $R_4$, $R_5$ and $R_6$ are hydrogen or lower alkyl, Z is

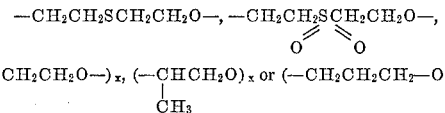

In the formula $x$ is an integer of at least one and $n$ is 0 or 1. All of these are new compounds except when Z is —$CH_2CH_2O$— or —$CH_2CH_2CH_2O$—, i.e. when Z contains an ether, thioether or sulfonyl linkage the compounds are novel. The preferred compounds are those where $n$ is 1 and an ether linkage is present. The novel compounds are useful as antioxidants for polyethylene and polypropylene and stabilizers for polyurethanes, acrylonitrile polymers, etc. and as dye assistant agents.

Typical examples of such compounds which can be prepared according to the invention are bis (1,3,2-dioxaphospholanoxy) ethane,
bis (4-methyl-1,3,2-dioxaphospholanoxy)-1-methylethane,
bis (4-ethyl-1,3,2-dioxaphospholanoxy)-1-ethylethane,
bis (4,5-dimethyl-1,3,2-dioxaphospholanoxy)-1,2-dimethyl ethane
bis (4,4,5,5-tetramethyl-1,3,2-dioxaphospholanoxy)-1,1,2,2-tetramethylethane,
1,3-bis (1,3,2-dioxaphospholanoxy) propane,
diethylene glycol diethylene diphosphite [$\beta,\beta'$-oxy-bis (2-ethyl-1,3,2-dioxaphospholane)] triethylene glycol diethylene diphosphite,
diethylene glycol di 1,2-propylene diphosphite [$\beta,\beta'$-oxy-bis (2-ethyl-4-methyl-1,3,2-dioxaphospholane)], [$\beta,\beta'$-oxy-bis (2-ethyl-4,4,5,5-tetramethyl-1,3,2-dioxaphospholane)],
polypropylene glycol diethylene diphosphite
(where the polypropylene glycol has a molecular weight of 525), polypropylene glycol diethylene diphosphite (where the polypropylene glycol has a molecular weight of about 450), thiodiglycol diethylene diphosphite, sulfonyldiglycol diethylene diphosphite, diethylene glycol dineopentylene diphosphite $\beta,\beta'$-oxy-bis-(2-ethyl-5,5-dimethyl-1,3,2-dioxophosphorinane) having the formula

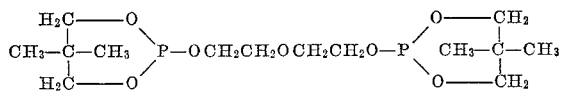

bis-(1,3,2-dioxophosphorinanoxy) ethane, 1,3-bis-(1,3,2-dioxaphosphorinanoxy) propane, bis - (4,4,6 - trimethyl-1,3,2-dioxaphosphorinanoxy) 1,1,3-trimethylpropane, triethylene glycol dineopentylene diphosphite, diethylene glycol dihexylene diphosphite (diethylene glycol di 2-methyl-2,4-pentylene diphosphite), diethylene glycol ditrimethylene diphosphite, diethylene glycol di 1,3-butylene diphosphite, diethylene glycol di(2-ethyl-1,3-hexylene) diphosphite, diethylene glycol di 2,4-pentylene diphosphite, diethylene glycol di(2-methyl-1,3-pentylene) diphosphite, diethylene glycol di(2,4-heptylene diphosphite, diethylene glycol di(2,2-diethyl-1,3-propylene) diphosphite, diethylene glycol di(2-ethyl - 2 - n - butyl-1,3-propylene) diphosphite, triethylene glycol dihexylene diphosphite, triethylene glycol ditrimethylene diphosphite, triethylene glycol di(2-ethyl-2-n-butyl 1,3-propylene) di-phosphite, polyethylene glycol (molecular weight 525) dineopentylene diphosphite, polyethylene glycol (molecular weight 725) dineopentylene diphosphite, dipropylene glycol dineopentylene diphosphite, dipropylene glycol dihexylene diphosphite, tripropylene glycol dineopentylene diphosphite, thiodiglycol dineopentylene diphosphite, thiodiglycol dihexylene diphosphite, sulfonyldiglycol dihexylene diphosphite, polypropylene glycol (molecular weight 725) dineopentylene diphosphite and diethylene glycol dineohexylene diphosphite.

By reacting one mol of a polyethylene glycol or polypropylene glycol with two mols of a triaryl phosphite or a dialkyl monoaryl phosphite i nthe presence of a dialkyl phosphite or diaryl phosphite, there are prepared novel compounds having the formula

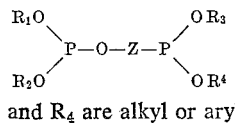

where $R_1$, $R_2$ $R_3$ and $R_4$ are alkyl or aryl and Z is

—CH$_2$CH$_2$SCH$_2$CH$_2$O—, —CH$_2$CH$_2$SCH$_2$CH$_2$O—, (—CH$_2$CH$_2$O—)$_x$

or

where $x$ is an integer of at least two. These new compounds are useful as antioxidants for polyethylene, polypropylene, natural rubber, etc., and as stabilizers for poly-urethane forming materials. Typical examples of such compounds are tetraphenyl diethylene glycol diphosphite, $\beta,\beta'$-oxy-bis-(ethyl diphenyl phosphite), tetra (isodecyl) diethylene glycol diphosphite, sym-diphenyl di (isodecyl) diethylene glycol diphosphite, phenyl tri (decyl) diethylene glycol diphosphite, tetra (lauryl) diethylene glycol diphosphite, tetra (octadecyl) diethylene glycol diphosphite, tetra (isodecyl) triethylene glycol diphosphite, tetra (isodecyl) dipropylene glycol diphosphite, tetra (decyl) polyethylene glycol diphosphite (where the polyethylene glycol has a molecular weight of 725), tetra (isodecyl) thiodiglycol diphosphite, tetra (octadecyl) sulfonyldiglycol diphosphite, tetra (lauryl) polypropylene glycol diphosphite (where the polypropylene glycol has a molecular weight of 750).

It is also possible to prepare novel phosphorus monomers and polymers with the aid of the diaryl phosphite and dialkyl phosphite catalysts. These polymers have the formula

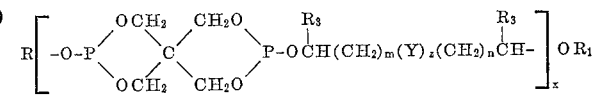

where R and $R_1$ are hydrogen alkyl or aryl groups, $m$ is zero or an integer, preferably not over ten, Y is S, O, NR$_2$, (OCH$_2$CH$_2$O)$_x$

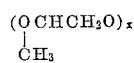

or CH$_2$, $n$ is zero or an integer, preferably not over 10, Z is zero or one, $R_2$ is hydrogen, alkyl or aryl, $R_3$ is H or CH$_3$, and $x$ is an integer of at least one. Preferably there are formed polymers of molecular weight of 1,000 to 20,000 although lower or higher molecular weight polymers can be prepared. The monomers are useful to prepare the polymers and both the monomers and polymers are useful as antioxidants for polyethylene, polypropylene, polystyrene and other polyolefins. The novel compounds are prepared by reacting the appropriate 3,9 dialkoxy or diaryloxy 2,4,8,10-tetraoxa-3,9-diphosphaspiro [5,5] undecane with the appropriate dihydric alcohol in a mol ratio of 1:1, in the presence of the diaryl phosphite or dialkyl phosphite in an amount of 0.1 to 1% by weight of the spiro compound and distilling out the monohydric alcohol or phenol at reduced pressure, e.g., 10–20 mm. The reaction can be stopped either by discontinuing the distillation or by adding excess monohydric alcohol, e.g., an alkanol such as methyl alcohol, decyl alcohol, or octadecyl alcohol or a phenol, e.g., phenol or cresol as a chain stopper and lowering the temperature below the distillation temperature. As the tetraoxadiphosphaspiro compound, there can be used any of those set forth previously in this specification. As the dihydric alcohol, there can be used ethylene glycol, trimethylene glycol, propylene glycol, diethylene glycol, dipropylene glycol, decamethylene glycol, hexamethylene glycol, triethylene glycol, thiodiglycol, diethanolamine, N-methyl diethanolamine, N-butyl diethanolamine, N-phenyl diethanolamine and N-octadecyl diethanolamine.

All of the new compounds set forth in the present specification are useful for imparting fire retarding properties to cellulose and cellulose esters such as cellulose acetate, etc.

The reaction can be carried out at atmospheric, superatmospheric or subatmospheric pressure, e.g., 0.1–100 mm. Preferably, the reaction is carried out at subatmospheric pressure in order that the phenol formed can be readily removed without any danger of damaging the product.

Unless otherwise stated, all parts and percentages are by weight.

*Example 1*

Triphenyl phosphite in an amount of 620 parts (2.0 mols), isodecyl alcohol (the commercial product made by the oxo process) in an amount of 319 parts (2.01 mols) and 1.75 parts of diphenyl phosphite (0.28% by weight of the triphenyl phosphite) were heated at 110–120° C. for 30 minutes. The phenol formed was then distilled at 10–15 mm. and was obtained in quantitative yield. The diphenyl decyl phosphite was left in the reaction pot, filtered with a little filter aid and was obtained in nearly quantitative yield as a colorless liquid having an $n_D^{25}$ 1.5180.

Example 2

The procedure of Example 1 was repeated replacing the diphenyl phosphite by di (decyl) phosphite in an amount of 1.8 part (0.28% by weight of the triphenyl phosphite). After removal of the phenol and filtration, the colorless diphenyl decyl phosphite was obtained in essentially quantitative yield.

Example 3

Triphenyl phosphite in an amount of 620 parts (2.0 mols), isodecyl alcohol in an amount of 645 parts (4.02 mols) and 1.75 part of diphenyl phosphite were heated at 110–120° C. for 30 minutes. The phenol formed was then distilled at 10–15 mm. pressure. Towards the completion of the distillation, the pot temperature was brought to 180–200° C. A quantitative yield of phenol was obtained. Phenyl didecyl phosphite was recovered from the pot and after filtration was obtained as a clear, colorless liquid in 98% yield and having an $n_D^{25}$ 1.4772.

When the diphenyl phosphite catalyst was replaced by 1.8 part of didecyl phosphite, the phenyl didecyl phosphite was similarly obtained.

Example 4

Triphenyl phosphite_____ 620 parts (2.0 mols).
Isodecyl alcohol_____ 976 parts (6.03 mols).
Diphenyl phosphite_____ 3.1 parts (0.5% of the triphenyl phosphite).

The phenol formed was removed by distillation through a short fractionating column at a pressure of 10–15 mm. When apparently all of the phenol was recovered, 50 additional parts of isodecyl alcohol (5% excess) were added to the reaction pot and then removed by distillation to insure complete reaction and removal of phenol. After filtration, a 98% yield of colorless tridecyl phosphite was obtained, $n_D^{25}$ 1.4556.

Similar results were obtained when 3.1 parts of didecyl phosphite were employed as a transesterification catalyst.

Example 5

Triphenyl phosphite_____ 620 parts (2.0 mols).
Lauryl alcohol_____ 1120 parts (6.0 mols).
Diphenyl phosphite_____ 3.1 parts.

The procedure of Example 4 was repeated including the subsequent addition of 50 parts of lauryl alcohol to give trilauryl phosphite in near quantitative yield as a colorless somewhat oily liquid.

Similarly when 6.03 mols of stearyl alcohol (octadecyl alcohol) were employed in place of the lauryl alcohol, tristearyl phosphite was obtained as a white waxy solid M.P. 40° C. With less pure stearyl alcohol as the starting material, the tristearyl phosphite melted at about 30° C.

Example 6

Triphenyl phosphite_____ 310 parts (1.0 mol).
Methoxy Carbowax 350 (monomethyl ether of polyethylene glycol of molecular weight 338)_____ 1014 parts (3.0 mols).
Diphenyl phosphite_____ 1.2 parts (0.4% of triphenyl phosphite).

The above mixture was heated at 110–120° C. for 30 minutes and the phenol then removed by distillation at 10–15 mm. pressure. A near quantitative recovery of phenol was obtained. Tris-methoxy Carbowax 350 phosphite was obtained in almost quantitative yield as a viscous, clear colorless liquid, $n_D^{25}$ 1.4675. This phosphite is miscible with water and many common organic solvents.

Example 7

Triphenyl phosphite_____ 930 parts (3 mols).
Monomethyl ether of triethylene glycol_____ 492 parts (3 mols).
Diphenyl phosphite_____ 9.0 parts (1% of the triphenyl phosphite).

The process of Example 6 was followed. The methoxyethoxyethyl diphenyl phosphite was recovered as a clear, colorless, somewhat viscous liquid.

Example 8

Triphenyl phosphite_____ 620 parts (2 mols).
Pentaerythritol_____ 136 parts (1 mol).
Isodecyl alcohol_____ 319 parts (2.0 mols).
Diphenyl phosphite_____ 3.1 parts (0.5% based on the TPP).

This mixture was heated at 110–120° C. for one hour and then the phenol formed was removed at 10–15 mm. pressure. Near the end of the reaction, the pot temperature was brought to 180–200° C. to insure completion. The liquid residue was filtered to give didecyl pentaerythritol diphosphite (3,9 didecyl-2,4,8,10-tetraoxa-3,9-diphosphaspiro[5,5]undecane) as a liquid $n_D^{25}$ 1.4723. Since the commercial isodecyl alcohol employed actually is a mixture of several isomeric decyl alcohols, the product obtained was a mixture of isomeric didecyl pentaerythritol diphosphites. Upon standing, some of these isomers tended to crystallize out.

By replacing the isodecyl alcohol by 2.01 mols of stearyl alcohol in Example 8, there was obtained distearyl pentaerythritol diphosphite having a melting point of about 40° C.

By replacing the isodecyl alcohol by 2 mols of methoxy Carbowax 350, there was obtained bis methoxy Carbowax 350 pentaerythritol diphosphite. This material is miscible with water and most common organic solvents.

Example 9

Triphenyl phosphite_____mols__ 2.0
Tridecyl alcohol_____do____ 6.03
Diphenyl phosphite_____grams__ 3.1

The process of Example 6 was repeated and tris (tridecyl) phosphite was recovered as the final product.

Example 10

Triphenyl phosphite_____mols__ 2.0
β-Phenoxyethanol _____do____ 6.03
Diphenyl phosphite_____grams__ 3.1

The process of Example 6 was repeated and tris (β-phenoxyethyl) phosphite recovered as the final product.

Example 11

Triphenyl phosphite_____mols__ 1.0
Monomethyl ether of triethylene glycol_____do____ 3.0
Diphenyl phosphite_____grams__ 1.2

The process of Example 6 was repeated and tris (methoxyethoxyethyl) phosphite recovered as the final product.

Example 12

Triphenyl phosphite_____mols__ 1.0
Methoxy Carbowax 550 (monomethyl ether of polyethylene glycol of molecular weight 538)__mols__ 3.0
Diphenyl phosphite_____grams__ 1.2

The process of Example 6 was repeated and tris-methoxy Carbowax 550 phosphite recovered as the final product.

Example 13

Example 7 was repeated but replacing the 3 mols of the methyl ether of triethylene glycol by 6 mols of this compound to obtain bis (methoxyethoxyethoxyethyl) phenyl phosphite as the product.

*Example 14*

| | | |
|---|---|---|
| Triphenyl phosphite | mols | 1.0 |
| Neopentyl glycol | do | 1 |
| Diphenyl phosphite | grams | 1.2 |

The above mixture was heated at 110–120° C. for 30 minutes and then 2 mols of phenol were removed by distillation at 10–15 mm. pressure. Then one mol of isodecyl alcohol was added to the pot and an additional mol of phenol removed by distillation at 10–15 mm. pressure and the isodecyl neopentylene phosphite (2-isodecyloxy - 5,5 - dimethyl-1,3,2 - dioxaphosphorinane) recovered from the pot in near quantitative yield.

*Example 15*

Example 14 was repeated but replacing the neopentyl glycol by 1 mol of neohexylene glycol (2-ethyl-2-methyl-1,3-propanediol). The isodecyl neohexylene phosphite (2-isodecyloxy - 5-ethyl-5-methyl-1,3,2 - dioxaphosphorinane) was recovered from the pot as a liquid $n_D^{25}$ 1.4602.

*Example 16*

Example 14 was repeated but the isodecyl alcohol was replaced by 1 mol of stearyl alcohol and stearyl neopentylene phosphite was recovered as the final product.

*Example 17*

Example 14 was repeated but the isodecyl alcohol was replaced by 1 mol of methoxytriglycol and methoxyethoxyethoxyethyl neopentylene phosphite was recovered as the final product.

*Example 18*

Example 14 was repeated but the isodecyl alcohol was replaced by 1 mol of methoxy Carbowax 350 and methoxy Carbowax 350 neopentylene phosphite was recovered as the final product.

*Example 19*

Example 14 was repeated but the neopentyl glycol was replaced by 1 mol of 1,3-butylene glycol and 2-isodecyloxy-4-methyl-1,3,2-dioxaphosphorinane was recovered as the final product.

*Example 20*

Example 14 was repeated but the neopentyl glycol was replaced by 1 mol of hexylene glycol and 2-isodecyloxy-4,4,6-trimethyl-1,3,2-dioxa-phosphorinane was recovered as the final product.

*Example 21*

Example 14 was repeated but the neopentyl glycol was replaced by 1 mol of 2-ethyl-1,3-hexanediol and 2-isodecyloxy-4-propyl-5-ethyl-1,3,2-dioxaphosphorinane was recovered as the final product.

*Example 22*

| | | |
|---|---|---|
| Triphenyl phosphite | mols | 2.0 |
| Pentaerythritol | do | 1.0 |
| Diphenyl phosphite | grams | 2.4 |

The above mixture was heated at 110–120° C. for 30 minutes and then 4 mols of phenol were removed by distillation at 10–15 mm. pressure. Then 2 mols of isodecyl alcohol were added to the pot and an additional two mols of phenol removed by distillation at 10–15 mm. pressure and the di isodecyl pentaerythritol diphosphite [3,9 di (isodecyloxy)-2,4,8,10-tetraoxa-3,9-diphosphaspiro [5,5] undecane] recovered from the pot in near quantitative yields.

*Example 23*

Example 22 was repeated but the isodecyl alcohol was replaced by 2 mols of octadecyl alcohol and di octadecyl pentaerythritol diphosphite was recovered as the final product.

*Example 24*

Example 22 was repeated but the isodecyl alcohol was replaced by 2 mols of methoxy Carbowax 350 and bis methoxy Carbowax 350 pentaerythritol diphosphite was recovered as the final product.

*Example 25*

Example 22 was repeated but the isodecyl alcohol was replaced by 2 mols of butyl Carbitol (monobutyl ether of diethylene glycol) and bis (butyl Carbitol) pentaerythritol diphosphite [3,9 di (butylethoxyethyl)-2,4,8,10-tetraoxa-3,9-diphosphaspiro [5,5] undecane] was recovered as the final product.

*Example 26*

| | | |
|---|---|---|
| Triphenyl phosphite | mols | 2.0 |
| Neopentyl glycol | do | 2.0 |
| Diphenyl phosphite | grams | 3.1 |

The above mixture was heated in a first step at 110–120° C. for 30 minutes and then 4 mols of phenol were distilled off at 10–15 mm. pressure. The distillation was stopped when the pot temperature rose to 140° C. since the catalyst begins to be destroyed at 145° C. under these pressure conditions. Then in a second step 1 mol of diethylene glycol was added and 2 additional mols of phenol removed by distillation at 10–15 mm. pressure. After all the phenol had come over the pot temperature rose to 180° C., at which point the heating was stopped. The diethylene glycol dineopentylene diphosphite [β,β' oxy-bis-(2-ethyl-5,5-dimethyl-1,3,2-dioxaphosphorinane)] was recovered from the pot in near quantitative yields.

*Example 27*

Example 26 was repeated but the diethylene glycol was replaced by 1 mol of triethylene glycol and triethylene glycol dineopentylene diphosphite was recovered as the final product. (In this example the final heating in the second step was to a pot temperature of 200° C.)

*Example 28*

Example 26 was repeated but the neopentyl glycol was replaced by 2.0 mols of hexylene glycol (2-methyl-2,4-pentanediol) and diethylene glycol dihexylene diphosphite was recovered as the final product.

*Example 29*

Example 26 was repeated but the diethylene glycol was replaced by 1 mol of thiodiglycol and thiodiglycol dineopentylene diphosphite was recovered as the final product.

*Example 30*

Example 26 was repeated but the neopentylene glycol was replaced by 2.0 mols of neohexylene glycol (2-methyl-2-ethyl-1,3 propanediol) and the diethylene glycol was replaced by triethylene glycol. Triethylene glycol dineohexylene diphosphite was recovered as the final product having a pale yellow water white color $n_D^{25}$ 1.4805 and a specific gravity of 1.145.

*Example 31*

| | | |
|---|---|---|
| Triphenyl phosphite | mols | 2 |
| Diethylene glycol | do | 1 |
| Diphenyl phosphite | grams | 2.4 |

The above mixture was heated at 110–120° C. for 30 minutes and then 2 mols of phenol were distilled off at 10–15 mm. pressure. There was recovered from the pot tetraphenyl diethylene glycol diphosphite [β,β'-oxy-bis-(ethyl diphenyl phosphite)].

*Example 32*

Example 31 was repeated but the triphenyl phosphite was replaced by 2 mols of di (isodecyl) phenyl phosphite and tetra isodecyl diethylene glycol diphosphite was recovered as the final product.

Example 33

Di phenyl pentaerythritol diphosphite _____ mols__ 1
Ethylene glycol _____ do____ 1
Di phenyl phosphite _____ grams__ 2

The above mixture was heated to 110–120° C. at 10–15 mm. pressure and the phenol was distilled off until a molecular weight determination of the residue showed that it was above 1000. This product had the formula

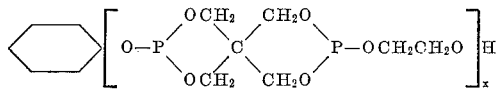

where $x$ indicates the number of repeating units (about an average of 3.5) for a molecular weight of 1000.

Example 34

Example 33 was repeated replacing the di phenyl pentaerythritol diphosphite by 1 mol of di decyl pentaerythritol diphosphite and heating at 10–15 mm. pressure until the molecular weight of the polymer in the pot had increased to about 20,000.

Example 35

Example 33 was repeated replacing the ethylene glycol by 1 mol of diethylene glycol and the heating was continued until the polymer in the pot had a molecular weight of 10,000 as determined by external measurement.

Example 36

Example 33 was repeated replacing the ethylene glycol by 1 mol of triethylene glycol and the heating was continued until the polymer formed had a molecular weight of 15,000.

Example 37

Example 33 was repeated replacing the ethylene glycol by 1 mol of trimethylene glycol and the heating was continued until the polymer formed had a molecular weight of 10,000.

Example 38

Example 33 was repeated replacing the ethylene glycol by 1 mol of dipropylene glycol and the heating was continued until the polymer formed had a molecular weight of 5000.

Example 39

Example 33 was repeated replacing the ethylene glycol by 1 mol of thiodiglycol and the heating was continued until the polymer formed had a molecular weight of 10,000.

Example 40

Example 33 was repeated replacing the ethylene glycol by 1 mol of diethanolamine and the heating was continued until the polymer formed had a molecular weight of 20,000.

What is claimed is:

1. A process comprising transesterifying an aromatic phosphite having the formula

wherein $R_1$, $R_2$ and $R_3$ are selected from the group consisting of phenyl, lower alkyl phenyl and halophenyl by liberation of the corresponding phenol by reaction with an alcohol from the group consisting of alkanols, 1,2-alkanediols, 1,3-alkanediols, polyethylene glycols, polypropylene glycols, thiodiglycol, sulfonyl diglycol pentaerythritol, mono lower alkyl ethers of ethylene glycol, phenyl and lower alkyl phenyl ethers of ethylene glycol, mono lower alkyl ethers of polyethylene glycol and tetrahydrofurfuryl alcohol and initiating said transesterification in the presence of a secondary phosphite having the formula

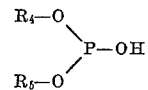

wherein $R_4$ and $R_5$ are selected from the group consisting of an alkyl group having up to 18 carbon atoms, cyclohexyl, phenyl, lower alkylphenyl and halophenyl as a catalyst.

2. A process according to claim 1 wherein said alcohol has a boiling point higher than that of the phenol liberated in the transesterification.

3. A process according to claim 2 wherein said aromatic phosphite is triphenyl phosphite.

4. A process according to claim 1 wherein said aromatic phosphite is triphenyl phosphite.

5. A process comprising transesterifying triphenyl phosphite with an alkanol, said transesterification being initiated in the presence of a dihydrocarbon phosphite, said hydrocarbon groups being selected from the group consisting of alkyl groups having up to 18 carbon atoms, cyclohexyl, phenyl, lower alkyl phenyl and halophenyl as a catalyst.

6. A process according to claim 5 wherein the alkanol has 10 to 18 carbon atoms.

7. A process comprising transesterifying triphenyl phosphite with a mono lower alkyl ether of ethylene glycol, said transesterification being initiated in the presence of a dihydrocarbon phosphite, said hydrocarbon groups being selected from the group consisting of alkyl groups having up to 18 carbon atoms, cyclohexyl, phenyl, lower alkyl phenyl and halophenyl as a catalyst.

8. A process comprising transesterifying triphenyl phosphite with a mono lower alkyl ether of a polyethylene glycol in the presence of a dihydrocarbon phosphite as a catalyst.

9. A process comprising transesterifying 1 mol of triphenyl phosphite with 1 mol of a 1,3-alkanediol, said transesterification being initiated in the presence of a dihydrocarbon phosphite, said hydrocarbon groups being selected from the group consisting of alkyl groups having up to 18 carbon atoms, cyclohexyl, phenyl, lower alkyl phenyl and halophenyl as a catalyst and removing the phenol to form a 2-phenoxy-1,3,2-dioxaphosphorinane.

10. A process according to claim 9 wherein 1 mol of the dioxaphosphorinane still containing the catalyst is further reacted with 1 mol of a member of the group consisting of alkanols, mono lower alkyl ethers of ethylene glycol and mono lower alkyl ethers of polyethylene glycols.

11. A process comprising transesterifying 2 mols of triphenyl phosphite with 1 mol of pentaerythritol, said transesterification being initiated in the presence of a di hydrocarbon phosphite, said hydrocarbon groups being selected from the group consisting of alkyl groups having up to 18 carbon atoms, cyclohexyl, phenyl, lower alkyl phenyl and halophenyl as a catalyst and removing the phenol produced to form a 3,9 diphenoxy 2,4,8,10-tetraoxa-3,9-diphosphaspiro [5,5] undecane.

12. A process according to claim 11 wherein the diphosphaspiro undecane still containing the catalyst is further reacted with 1 to 2 mols of a member of the group consisting of alkanols, mono lower alkyl ethers of ethylene glycol and mono lower alkyl ethers of diethylene glycol.

13. A process according to claim 9 wherein 2 mols of the dioxaphosphorinane still containing the catalyst is further reacted with 1 mol of a member of the group consisting of polymethylene glycols, polyethylene glycols, polypropylene glycols, thiodiglycol and sulfonyl diglycol.

14. A process according to claim 10 wherein 2 mols of the product still containing the catalyst is further reacted with 1 mol of a member of the group consisting of polymethylene glycols, polyethylene glycols, polypropylene glycols, thiodiglycol and sulfonyl diglycol.

15. A process comprising transesterifying 2 mols of triphenyl phosphite with one mol of a member of the group consisting of polymethylene glycols, polyethylene glycols, polypropylene glycols, thiodiglycol and sulfonyl diglycol, said transesterification being initiated in the presence of a dihydrocarbon phosphite, said hydrocarbon groups being selected from the group consisting of alkyl groups having up to 18 carbon atoms, cyclohexyl, phenyl, lower alkyl phenyl and halophenyl as a catalyst.

16. A process comprising transesterifying 2 mols of triphenyl phosphite with 4 mols of an alkanol having 10 to 18 carbon atoms, said transesterification being initiated in the presence of a dihydrocarbon phosphite, said hydrocarbon groups being selected from the group consisting of alkyl groups having up to 18 carbon atoms, cyclohexyl, phenyl, lower alkyl phenyl and halophenyl as a catalyst, removing the phenol formed and then further transesterifying the 2 mols of dialkyl mono phenyl phosphite thus formed and still containing said catalyst with 1 mol of a member of the group consisting of polymethylene glycols, polyethylene glycols, polypropylene glycols, thiodiglycol and sulfonyl diglycol.

17. A compound having the formula $$\begin{array}{c} R_1 \\ R_2-C \\ (R_3-C-R_4)_n \\ R_5-C \\ R_6 \end{array} \begin{array}{c} O \\ \\ O \end{array} P-OR_7$$

wherein $R_1$, $R_2$, $R_3$, $R_4$, $R_5$ and $R_6$ are selected from the group consisting of hydrogen and lower alkyl, $n$ is an integer of the group consisting of 0 and 1 and $R_7$ is selected from the group consisting of lower alkoxyethyl, lower alkoxypolyethoxyethyl, phenoxyethyl, lower alkyl substituted phenoxyethyl, phenoxypolyethoxyethyl, and lower alkyl substituted phenoxypolyethoxyethyl.

18. A compound according to claim 17 wherein $n$ is 1 and $R_7$ is lower alkoxypolyethoxyethyl.

19. A compound having the formula $$R_1OP \begin{array}{c} OCH_2 \\ \\ OCH_2 \end{array} C \begin{array}{c} CH_2O \\ \\ CH_2O \end{array} POR$$

wherein $R_1$ is selected from the group consisting of phenoxyethyl lower alkyl substituted phenoxyethyl, lower alkoxyethyl, phenoxyethoxyethyl, lower alkyl substituted phenoxyethoxyethyl and lower alkoxy $(CH_2CH_2O)_xCH_2CH_2$ where $x$ is an integer of at least one and $R_2$ is selected from the group consisting of $R_1$, alkyl having up to 18 carbon atoms, phenyl and lower alkyl phenyl.

20. A compound according to claim 19 wherein both $R_1$ and $R_2$ contain the grouping lower alkoxy $(CH_2CH_2O)_xCH_2CH_2$ where $x$ is an integer of at least one.

21.

$$\begin{array}{c} R_1 \\ R_2-C-O \\ (R_3-C-R_4)_n \\ R_5-C-O \\ R_6 \end{array} P-O-Z-P \begin{array}{c} O-C-R_2 \\ (R_3-C-R_4)_n \\ O-C-R_5 \\ R_6 \end{array}$$

where $R_1$, $R_2$, $R_3$, $R_4$, $R_5$ and $R_6$ are selected from the group consisting of hydrogen and lower alkyl, $n$ is an integer of the group consisting of 0 and 1 and Z is a member of the group consisting of $-CH_2CH_2SCH_2CH_2O-, -CH_2CH_2SCH_2CH_2O-$
$\qquad\qquad\qquad\qquad\qquad O \diagup\diagdown O$ $(CH_2CH_2O-)_x, \left(\begin{array}{c} CHCH_2O- \\ | \\ CH_3 \end{array}\right)_x$ and $x$ is an integer of at least 2.

22. Compounds according to claim 21 wherein $n$ is 1 and Z contains at least one ether linkage.

23. Compounds having the formula $$\begin{array}{c} R_1O \\ \\ R_2O \end{array} P-OZ-P \begin{array}{c} OR_3 \\ \\ OR_4 \end{array}$$

and wherein $R_1$, $R_2$, $R_3$ and $R_4$ are selected from the group consisting of alkyl having up to 18 carbon atoms, phenyl and lower alkyl phenyl and Z is selected from the group consisting of $-CH_2CH_2SCH_2CH_2O-, CH_2CH_2SCH_2CH_2O-, (-CH_2CH_2O-)_x$
$\qquad\qquad\qquad\qquad O \diagup\diagdown O$ and $\left(\begin{array}{c} -CHCH_2O- \\ | \\ CH_3 \end{array}\right)_x$ where $x$ is an integer of at least 2.

24. Compounds according to claim 23 wherein Z is $(CH_2CH_2O)_x$.

References Cited in the file of this patent

UNITED STATES PATENTS

| 2,241,244 | Conary et al. | May 6, 1941 |
| 2,280,450 | Reuter | Apr. 21, 1942 |
| 2,587,616 | Harman | Mar. 4, 1952 |
| 2,728,790 | Sroog | Dec. 27, 1955 |
| 2,847,443 | Hechenbleikner et al. | Aug. 12, 1958 |
| 2,961,454 | Gould et al. | Nov. 22, 1960 |
| 3,000,850 | Ainsworth | Sept. 19, 1961 |

FOREIGN PATENTS

| 805,931 | Great Britain | Mar. 3, 1955 |
| 553,997 | Canada | Mar. 4, 1958 |

OTHER REFERENCES

Allen et al.: J. Am. Chem. Soc., vol. 77, 1955, p. 2874.
Ayres et al.: Journal Chem. Soc. (London), 1957, 1109–1114.
Weston Product List Ml 3 4377, July 15, 1960, pp. 1–3.